United States Patent
Barenys et al.

(10) Patent No.: US 6,725,320 B1
(45) Date of Patent: Apr. 20, 2004

(54) I²C BUS SWITCHING DEVICES INTERSPERSED BETWEEN I²C DEVICES

(75) Inventors: Michael Anton Barenys, Austin, TX (US); Robert Allan Faust, Austin, TX (US); Joel Gerald Goodwin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 09/779,364

(22) Filed: Feb. 8, 2001

(51) Int. Cl.⁷ .............................................. G06F 13/00
(52) U.S. Cl. ..................................... 710/316; 710/314
(58) Field of Search ................................ 710/316, 317, 710/313, 124, 305, 314; 370/362, 463, 351; 709/250, 218, 253; 712/29, 33

(56) References Cited

U.S. PATENT DOCUMENTS

| | | | |
|---|---|---|---|
| 4,016,546 A | * | 4/1977 | Bennett et al. |
| 5,473,264 A | * | 12/1995 | Mader et al. |
| 5,892,933 A | | 4/1999 | Voltz ........................... 395/311 |
| 5,946,495 A | | 8/1999 | Scholhamer et al. ... 395/750.01 |
| 6,233,643 B1 | * | 5/2001 | Andrews et al. |
| 6,339,806 B1 | * | 1/2002 | Foster, Sr. et al. |

FOREIGN PATENT DOCUMENTS

EP          0892352 A1       1/1999    .......... G06F/13/40

OTHER PUBLICATIONS

International Search Report.

* cited by examiner

*Primary Examiner*—Gopal C. Ray
(74) *Attorney, Agent, or Firm*—Duke W. Yee; Mark E. McBurney; Lisa L. B. Yociss

(57) ABSTRACT

A bus switch module for use in a bus such as an I2C bus is provided. In one embodiment, the switch module includes a control unit and a switch. The control unit includes an input for receiving instructions from a bus driver as to whether to close or open the switch. The switch includes a first and a second data connection which connect the switch to a first and a second segment of the bus and includes a control input for receiving commands from the control unit. The control unit opens and closes the switch in response to instructions received from the bus driver and signals received in the first data connection are passed to the second data connection only when the switch is closed in response to a command from the control unit.

26 Claims, 3 Drawing Sheets

I²C BUS SWITCHING DEVICES INTERSPERSED BETWEEN I²C DEVICES

CROSS REFERENCE TO RELATED APPLICATIONS

The present application is related to U.S. patent application Ser. No. 09/779,368 entitled "A Method for Isolating an I2C Bus Fault Using Self Bus Switching Device" filed Feb. 8, 2001 and to U.S. patent application Ser. No. 09/773,185 entitled "Dynamically Allocating I2C Addresses Using Self Bus Switching Device" filed Jan. 31, 2001. The content of the above mentioned commonly assigned, co-pending U.S. Patent applications are hereby incorporated herein by reference for all purposes.

BACKGROUND OF THE INVENTION

1. Technical Field

The present invention relates to computer bus architecture. More specifically, the present invention relates to Inter Integrated Circuit (I²C) buses.

2. Description of Related Art

Many similarities exist between seemingly unrelated designs in consumer, industrial and telecommunication electronics. Examples of similarities include intelligent control, general-purpose circuits (i.e. LCD drivers, I/O ports, RAM) and application-oriented circuits. The Philips Inter Integrated Circuit (I²C) bus is a bi-directional two-wire serial bus designed to exploit these similarities.

Devices on the I²C bus are accessed by individual addresses, 00-FF (even addresses for Writes, odd addresses for reads). The I²C architecture can be used for a variety of functions. One example is Vital Product Data (VPD). Each component in the system contains a small Electrically Erasable Programmable Read Only Memory (EEPROM) (typically 256 bytes) which contains the VPD information such as serial numbers, part numbers, and EC revision level.

I²C busses can connect a number of devices simultaneously to the same pair of bus wires. However, a problem results when one of the devices malfunctions and pulls a bus signal (clock or data) low. The bus will not operate and it is very difficult to determine which of the numerous devices connected to the I²C bus is responsible. A similar problem occurs when one of the bus conductors becomes shorted to a low impedance source, such as, for example, ground.

Therefore, an improved I²C bus from which it is readily determinable the device that has malfunctioned resulting in the bus ceasing to operate would be desirable.

SUMMARY OF THE INVENTION

The present invention provides a bus switch module for use in a bus such as an I²C bus. In one embodiment, the switch module includes a control unit and a switch. The control unit includes an input for receiving instructions from a bus driver as to whether to close or open the switch. The switch includes a first and a second data connection which connect the switch to a first and a second segment of the bus and includes a control input for receiving commands from the control unit. The control unit opens and closes the switch in response to instructions received from the bus driver and signals received in the first data connection are passed to the second data connection only when the switch is closed in response to a command from the control unit. Thus, the bus switch module allows a bus driver to isolate devices and switch modules connected in series by opening or closing the switch.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
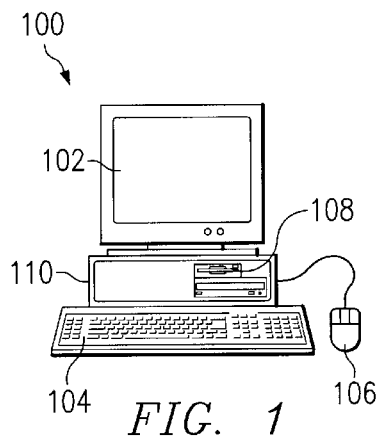
FIG. 1 depicts a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
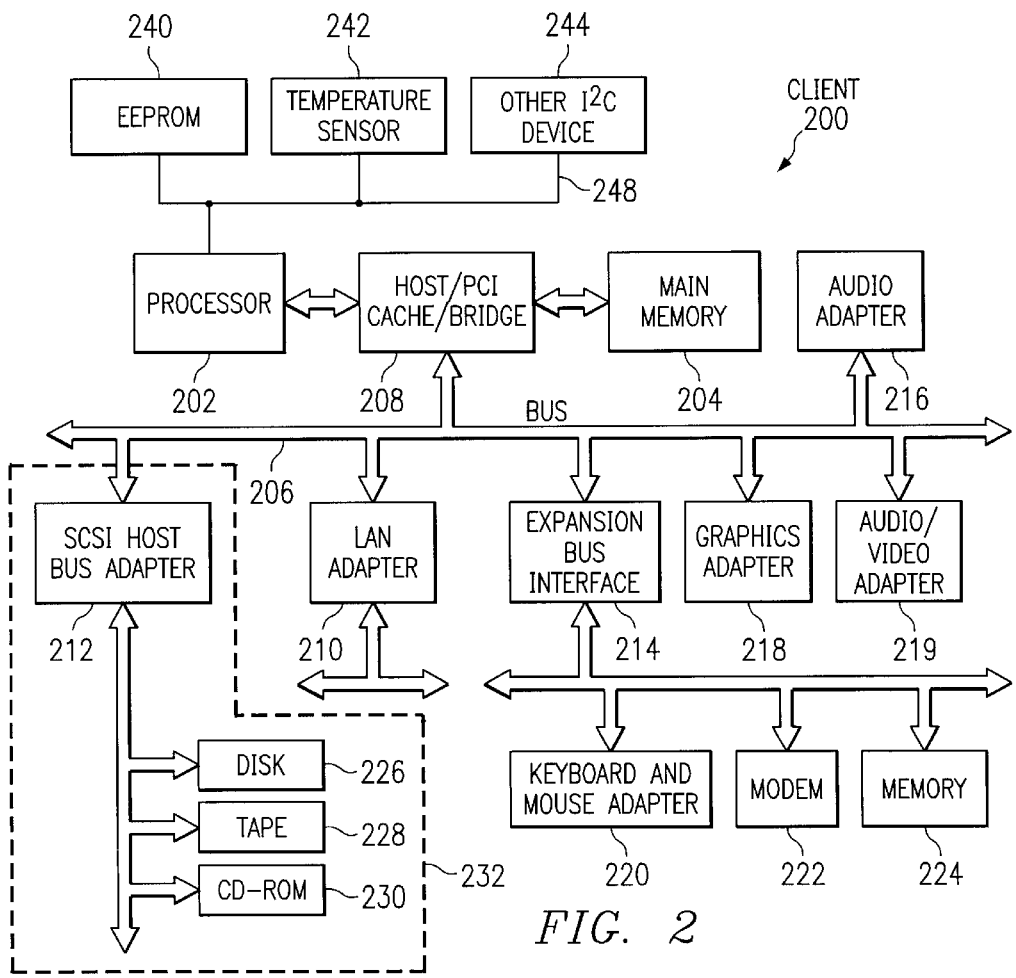
FIG. 2 depicts a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs an I²C bus architecture. The I²C bus 248 is a bi-directional serial bus requiring only two wires: a serial data line (SDA) and a serial clock line (SCL). Although serial buses do not have the throughput capability of parallel buses, serial buses require less wiring and fewer Integrated Circuit (IC) connector pins. Each device (processor 202, electronically erasable and programmable read only memory (EEPROM) 240, temperature sensor 242, and any other I²C device 244) connected to I²C bus 248 is software addressable by a unique address. The devices can operate as either transmitters or receivers. All I²C bus compatible devices have an on-chip interface which allows the devices to communicate directly with each other via the I²C bus 248. A simple master/slave relationship exists at all times. A master is a device which initiates a data transfer and the clock signals to permit the transfer, and any device addressed at the time of transfer is considered a slave. The I²C bus is a multimaster bus, meaning more than one device capable of controlling the bus can be connected to it. However, the present implementation is operated in a single-master mode. Typical I²C local bus implementations will support three or four I²C expansion slots or add-in connectors.

Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to local bus 206 by direct component connection. In contrast, audio adapter 216, graphics adapter 218, and audio/video adapter 219 are connected to local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226–230.

I²C buses can connect a number of devices simultaneously to the same pair of bus wires. However, a problem results when one of the devices malfunctions and pulls a bus signal (clock or data) low. The I²C bus will not operate in this situation, and it is difficult to determine which device is causing the problem. A similar problem occurs when one of the I²C bus conductors becomes shorted to a low impedance source, such as ground. The solution to these problems is to break the bus into sections in order to determine which section contains the fault. This can be accomplished with the I²C self bus switching device.

The I²C self bus switching device monitors the I²C bus and responds to its own address. The device also passes bus signals through if its switches are turned on. "On" means that the circuit is closed (i.e. the devices downstream from the switch will be connected to the bus and can see the bus traffic). When the switch is "off", the downstream devices are disconnected from the bus. The device can be commanded to turn its switches on or off, and the switches can also be turned off independent of the I²C bus by the switch reset signal. An eight-pin package, for example, permits one address bit to be programmed. This allows switch devices to deal with a bus that has a forked path. A larger pin package can have more address options.

Figure 3:
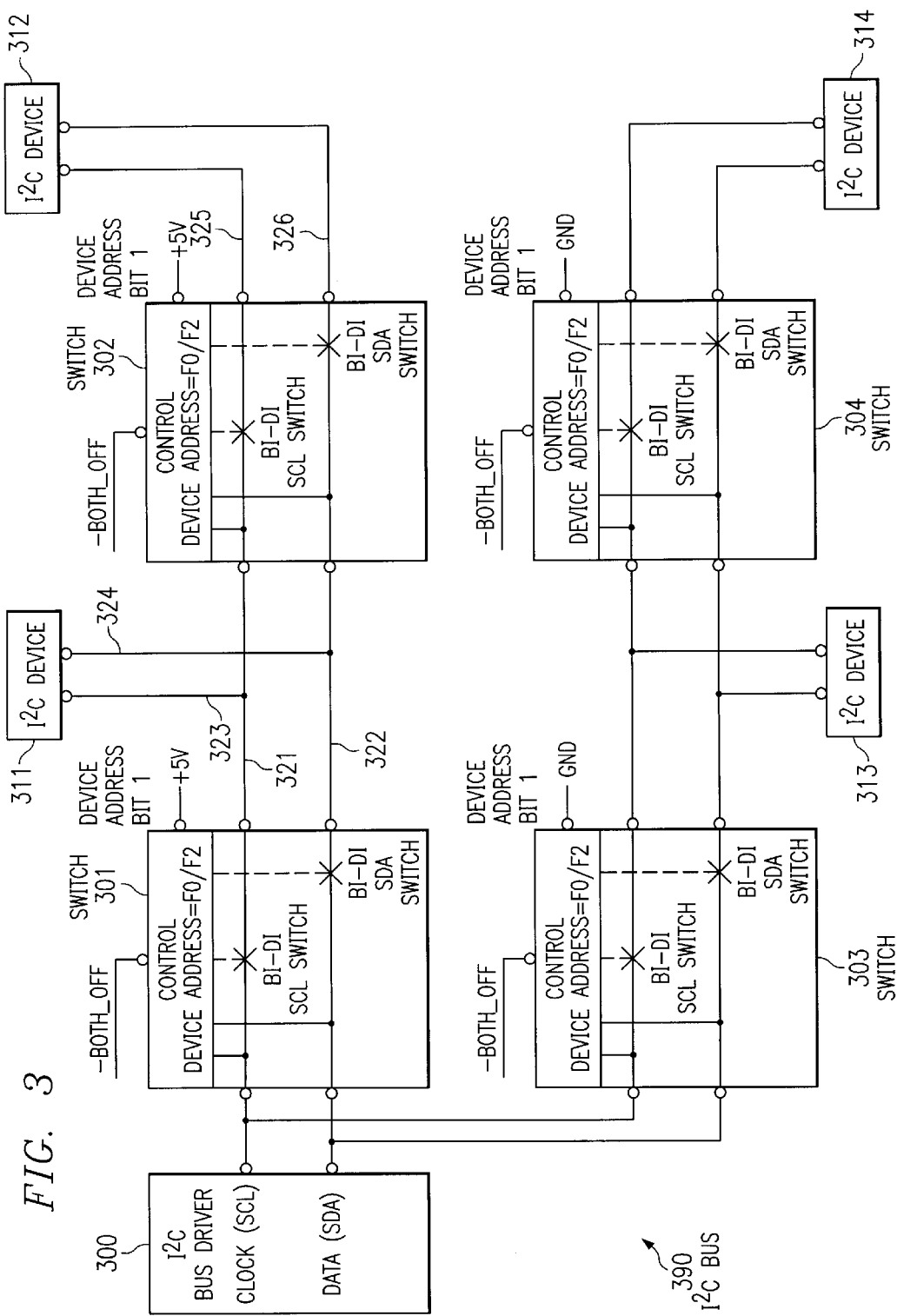
FIG. 3 depicts a schematic diagram illustrating a I²C self bus switching device in accordance with the present invention.

Referring now to FIG. 3, a schematic diagram illustrating a I²C self bus switching device is depicted in accordance with the present invention. I²C bus 390 may be implemented as, for example, I²C bus 248 in FIG. 2. The bus driver 300 can communicate with the four main devices 311–314, plus switches 301–304. If a fault occurs on the I²C bus, the system will assert a signal to reset all of the switches 301–304. The bus master will send a bus command on a predefined address to indicate that switch 301 should turn on. Since only switch 301 can see this command (switch 302 is disconnected), switch 301 operates but switch 302 does not, since the off condition of switch 301 prevented switch 302 from seeing the command. This switch-on command connects the device 311 and switch 302 to the bus. If a fault now exists, it is located in device 311, switch 302, or on the bus connectors 321–324 just switched on.

If no fault exists, the bus master can once again send a command to the predefined address. Both switches 301 and 302 will see this command, but switch 301 will not change its switch status since it is already on. Switch 302 will respond to the command, and will then connect device 312 to the bus. If a fault occurs, it is located in device 312 or on the bus connectors 325 and 326. This process is continued with the switches 303 and 304 and devices 313 and 314. In this example, switches 301 and 303 are connected in parallel, but switch 303 has an address bit pulled down, which makes its predefined address different from that of switch 301.

Although the switches have been described herein as either separate chips or incorporated into the I2C bus itself, the switches could also be incorporated into one of the devices connected to the I2C bus. Furthermore, the switch could be incorporated into an existing switch on an I2C device with separate signals and/or commands to indicate which switching function that the switch should perform. Thus, the present invention is not limited to the specific embodiment described herein.

Figure 4:
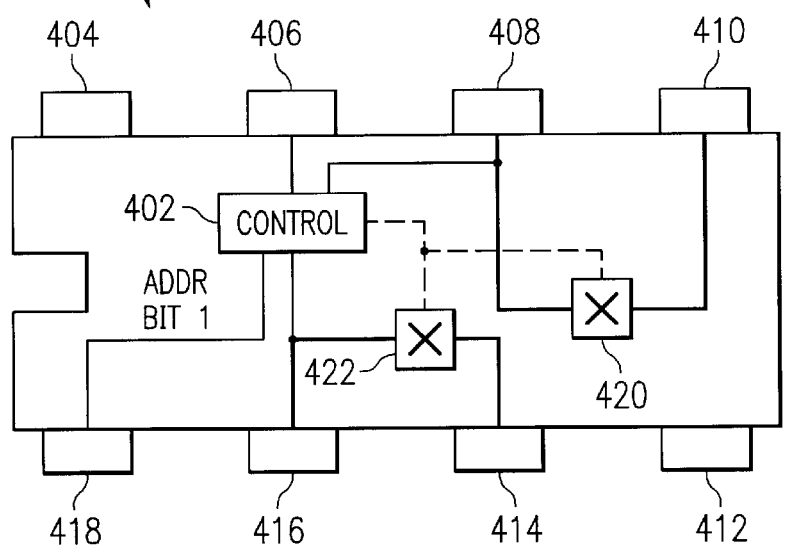
FIG. 4 depicts a block diagram of an I²C bi-directional bus switch module in accordance with the present invention.

With reference now to FIG. 4, a block diagram of an I²C bi-directional bus switch module is depicted in accordance with the present invention. I²C bi-directional bus switch module 400 may be implemented as, for example, any of switches 301–304 in FIG. 3. In the depicted example, switch module 400 is an eight pin 404–418 package that includes control unit 402 and switches 420–422. For clarity, not all connections, such as power connections, within switch module 400 are shown.

Pin 404 is a voltage input pin connected, in one embodiment, to a 5 volt power source. Pin 412 is connected to ground. Control unit 402 will respond to a predefined address, one bit of which is determined by pin 418 being pulled high or low. Thus, the bus driver may direct certain data or instructions to a particular switch module.

Pin 416 receives clock signals from a bus driver and passes these signals to control unit 402 as well as to clock signal switch 422. Clock signal switch 422 can be closed or opened by control unit 402 as directed by a bus driver. If clock signal switch 422 is open, any clock signals received via pin 416 are prevented from being sent to downstream switch modules or devices. If clock signal switch 422 is closed, then any clock signal received via pin 416 is still received by control unit 402 but in addition, the signal is passed downstream to other switch modules and/or devices via pin 414. Clock signal switch 422 may also receive signals from pin 414 which may be passed to control unit 402 as well as upstream to other switch modules, devices, and/or the bus driver via pin 416 if clock signal switch 422 is closed and are prevented from being passed upstream if clock signal switch 422 is open.

Pin 408 receives data signals from a bus driver and passes these data signals to both the control unit 402 and data signal switch 420. If control unit 402 has been instructed by the bus driver to close data signal switch 420, then data signals received via pin 408 are still received by control unit 402 but in addition, the signals are passed downstream to other switch modules and/or devices by data signal switch 420 via pin 410. If control unit 402 has been instructed by the bus driver to open data signal switch 420, then data signals received via pin 408 are prevented from being passed downstream by data signal switch 420. Similarly, any data signals received from downstream by data signal switch 420 via pin 410 are passed or prevented from being passed upstream to other switch modules, devices, and/or the bus driver depending on whether data signal switch 420 has been closed or opened by control unit 402.

Switch module 400 also includes a pin 406 which receives switch reset signals from the bus driver and passes these signals to control unit 402. If a switch reset signal is received by control unit 402, both switches 420–422 are opened. By doing this, the bus driver can reset all switch modules at once in response to a malfunctioning device or switch module that has caused the I²C bus cease functioning properly and then determine which of the devices has caused the problem by selectively turning on switch modules until the malfunctioning device or switch is found.

The bi-directional bus switch module depicted herein is given merely by way of example and is not intended as an architectural limitation to the present invention. Other embodiments of a bus switch may include different numbers of pins and include other components not shown.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system including a bus switch module, comprising:
    a plurality of switch units coupled to said bus interspersed between ones of said plurality of devices;
    a control unit included in each one of said plurality of switches, said control unit having an input for receiving instructions from a bus driver;
    a plurality of devices coupled serially to a bus;
    each one of said plurality of devices being separated serially on said bus from others of said plurality of devices utilizing ones of said plurality of switch units; and
    the control unit opens and closes the plurality of switches in response to instructions received from the bus driver.

2. The system as recited in claim 1, further comprising:
    each one of said plurality of switches having a first and a second data connection which connect each one of the plurality of switches to a different segment of said bus;
    wherein each one of the plurality of switches is a bi-directional switch capable of passing signals received at the second data connection to the first data connection and of passing signals received at the first data connection to the second data connection only when each one of the plurality of switches is closed.

3. The system as recited in claim 1, wherein the plurality of switches further comprises:
    a first one of said plurality of switches located on said bus serially between a bus driver and a first one of said plurality of devices;
    said first one of said plurality of switches having a first and a second data connection which connects said first one of said plurality of switches to a first segment of said bus;
    a second one of said plurality of switches located on said bus serially between said first one of said plurality of devices and a second one of said plurality of devices;
    said second one of said plurality of switches having a third and a fourth data connection which connects said second one of said plurality of switches to a second segment of said bus;
    said first and second ones of said plurality of devices being electrically isolated from said bus when said first one of said plurality of switches is opened, and said first and second ones of said plurality of devices being electrically coupled to said bus when said first one and said second one of said plurality of switches are closed;
    said first one of said plurality of devices being electrically coupled to said bus and second one of said plurality of devices being electrically isolated from said bus when said first one of said plurality of switches is closed and said second one of said plurality of switches is opened; and
    said control unit opening and closing said first and second ones of said plurality of switches in response to instructions to electrically couple or isolate said plurality of devices from said bus.

4. The system as recited in claim 1, wherein each one of said plurality of switches is a clock switch for passing clock signals only when the clock switch is closed.

5. The system as recited in claim 1, wherein each one of said plurality of switches is a data switch for passing data signals only when the data switch is closed.

6. The system as recited in claim 1, wherein each one of a first plurality of said plurality of switches is a clock switch for passing clock signals only when the clock switch is closed and each one of a second plurality of said plurality of switches is a data switch for passing data signals only when the data switch is closed.

7. The system as recited in claim 1, wherein each one of said plurality of devices is an inter-integrated (I2C) device, and the bus is an inter integrated circuit bus.

8. The system as recited in claim 1, wherein the control unit includes a reset input and a reset module which, in response to receiving a reset signal from the bus driver, opens said plurality of switches.

9. A bus for use in connecting electronic components, comprising:
   a bus driver coupled to a bus;
   a plurality of devices coupled serially to said bus;
   a plurality of bus switch modules coupled to said bus interspersed between ones of said plurality of devices;
   each one of said plurality of devices being separated serially on said bus from others of said plurality of devices utilizing ones of said plurality of bus switch modules;
   each of the plurality of bus switch modules including:
      a control unit with an input for receiving instructions from said bus driver; and
      a switch with a first and a second data connection which connect the switch to a first and a second segment of said bus; wherein
      the control unit opens and closes the switch in response to instructions received from the bus driver; and
      signals received in the first data connection are passed to the second data connection only when the switch is closed.

10. The bus as recited in claim 9, wherein the switch is a bi-directional switch capable of passing signals received at the second data connection to the first data connection and of passing signals received at the first data connection to the second data connection only when the switch is closed.

11. The bus as recited in claim 9, wherein the switch is a first switch and the signals are first signals, further comprising:
    a second switch with a third and a fourth data connection which connect the switch to a third and a fourth segment of the bus; wherein
    the control unit opens and closes the second switch in response to instructions received from the bus driver; and
    second signals received in the third data connection are passed to the fourth data connection only when the switch is closed.

12. The bus as recited in claim 11, wherein the second switch is a bi-directional switch capable of passing signals received at the fourth data connection to the third data connection and of passing signals received at the third data connection to the fourth data connection only when the second switch is closed.

13. The bus as recited in claim 11, wherein the first switch is a clock switch for passing clock signals only when the clock switch is closed and the second switch is a data switch for passing data signals only when the data switch is closed.

14. The bus as recited in claim 9, wherein the switch is a clock switch for passing clock signals only when the clock switch is closed.

15. The bus as recited in claim 9, wherein the switch is a data switch for passing data signals only when the data switch is closed.

16. The bus as recited in claim 9, wherein each one of the plurality of devices is an inter-integrated (I2C) device, and the bus is an inter integrated circuit bus.

17. The bus as recited in claim 9, wherein the control unit includes a reset input and a reset module which, in response to receiving a reset signal from the bus driver, opens both switches.

18. A data processing system, comprising:
    a plurality of components coupled serially to a bus;
    said bus communicably coupling the plurality of components wherein the bus comprises:
       a bus driver;
       a plurality of bus switch modules coupled to said bus interspersed between ones of said plurality of components, each one of said plurality of components being separated serially on said bus from others of said plurality of components utilizing one of said plurality of bus switch modules;
       said plurality of bus switch modules each connected by a plurality of bus lanes with at least and of the plurality bus switch modules connected to the bus driver;
       wherein each of the plurality of bus switch modules comprises:
          a control unit with an input for receiving instructions from a bus driver; and
          a switch with a first and a second data connection which connect the switch to a first and a second segment of a bus; wherein
          the control unit opens and closes the switch in response to instruction received from the bus driver; and
          signals received in the first data connection are passed to the second data connection only when the switch is closed.

19. The data processing system as recited in claim 18, wherein the switch is a bi-directional switch capable of passing signals received at the second data connection to the first data connection and of passing signals received at the first data connection to the second data connection only when the switch is closed.

20. The data processing system as recited in claim 18, wherein the switch is a first switch and the signals are first signals, further comprising:
    a second switch with a third and a fourth data connection which connect the switch to a third and a fourth segment of the bus; wherein
    the control unit opens and closes the second switch in response to instructions received from the bus driver; and
    second signals received in the third data connection are passed to the fourth data connection only when the switch is closed.

21. The data processing system as recited in claim 20, wherein the second switch is a bi-directional switch capable of passing signals received at the fourth data connection to the third data connection and of passing signals received at the third data connection to the fourth data connection only when the second switch is closed.

22. The data processing system as recited in claim 20, wherein the first switch is a clock switch for passing clock signals only when the clock switch is closed and the second switch is a data switch for passing data signals only when the data switch is closed.

23. The data processing system as recited in claim 18, wherein the switch is a clock switch for passing clock signals only when the clock switch is closed.

24. The data processing system as recited in claim 18, wherein the switch is a data switch for passing data signals only when the data switch is closed.

25. The data processing system as recited in claim 18, wherein each one of said plurality of components is an inter integrated (I2C) device, and the bus is an inter integrated circuit bus.

26. The data processing system as recited in claim 18, wherein the control unit includes a reset input and a reset module which, in response to receiving a reset signal from the bus driver, opens both switches.

* * * * *

UNITED STATES PATENT AND TRADEMARK OFFICE
CERTIFICATE OF CORRECTION

PATENT NO. : 6,725,320 B1 Page 1 of 1
APPLICATION NO. : 09/779364
DATED : April 20, 2004
INVENTOR(S) : Barenys et al.

It is certified that error appears in the above-identified patent and that said Letters Patent is hereby corrected as shown below:

Col. 8, line 20: after "least" delete "and" insert --one--.

Col. 8, line 31: after "response to" delete "instruction" and insert --instructions--.

Signed and Sealed this

First Day of May, 2007

JON W. DUDAS
*Director of the United States Patent and Trademark Office*